United States Patent [19]

Tauscher et al.

[11] Patent Number: 4,623,454
[45] Date of Patent: Nov. 18, 1986

[54] MASS TRANSFER COLUMN

[75] Inventors: Willy Tauscher; Felix Streiff, both of Winterthur; Peter Mathys, Neuhausen, all of Switzerland

[73] Assignee: Sulzer Brothers Limited, Winterthur, Switzerland

[21] Appl. No.: 677,864

[22] Filed: Dec. 4, 1984

[30] Foreign Application Priority Data

Dec. 15, 1983 [CH] Switzerland ............... 6679/83
Jul. 19, 1984 [CH] Switzerland ............... 3503/84

[51] Int. Cl.[4] ............................................. C02F 3/00
[52] U.S. Cl. ................................. 210/150; 261/112
[58] Field of Search ............. 210/150, 151; 261/112

[56] References Cited

U.S. PATENT DOCUMENTS 3,227,429  1/1966  Renzi ................................. 210/150
3,347,381 10/1967  Minch et al. ..................... 210/150
3,963,810  6/1976  Holmberg et al. ............... 261/112
4,303,600 12/1981  Roe, Jr. ............................ 261/112

FOREIGN PATENT DOCUMENTS

1004046  9/1965  United Kingdom .

Primary Examiner—John Adee
Attorney, Agent, or Firm—Kenyon & Kenyon

[57] ABSTRACT

The mass transfer column through which a continuous phase and at least one dispersed phase flow in countercurrent has two embodiments of packing elements disposed in the mass transfer section of the column. The first embodiment takes the form of corrugated layers which are disposed parallel to the column axis and engage one another, the corrugations of adjacent layers crossing one another. In the second embodiment plane intermediate layers are introduced between adjacent corrugated layers. The elements with intermediate layers provide cross-conveyance of the dispersed phase while the corrugated elements are responsible for mass transfer and for maintaining the dispersion distribution.

15 Claims, 17 Drawing Figures

MASS TRANSFER COLUMN

This invention relates to a mass transfer column. More particularly, this invention relates to a mass transfer column employing a plurality of vertically stacked packing elements.

As is known, mass transfer columns have been constructed so that a continuous phase and at least one other phase may flow in countercurrent relation within the column. In addition, in a mass transfer part of the column, packing elements have been provided in order to effect a mass transfer between the phases. In many cases, the packing elements have been constructed of a plurality of contacting layers, at least some of the layers having corrugations so as to bound flow channels. Further, the corrugations have been disposed at an angle to the column axis with the corrugations of adjacent layers crossing one another. As described in Swiss Pat. No. 398,503, the corrugations may also have a wavy or zig-zag contour.

Mass transfer columns which employ packing elements of the above type have frequently been used as rectification columns wherein a liquid phase descends as a film over the layer surfaces while a rising gas phase fills up the free spaces of the packing elements.

As described in Swiss Pat. No. 398,503, if an increase of superficial area is required in a packing, an uncorrugated layer can be introduced between every two corrugated layers. In this case, the size of the uncorrugated layer is identical to that of the corrugated layers, i.e. the layers cover or mask each other completely.

It has also been known to use the mass transfer column as described above for extraction or absorption purposes. In this case, a liquid phase flows continuously downwards or upwards through the packing elements while filling the free spaces between the layers of the element. At the same time, at least one dispersed phase flows upwardly or downwardly, respectively through the free spaces between the layers, i.e. through the flow channels defined by the corrugations in order to be brought into contact, with the oppositely flowing liquid phase. In the case of two dispersed phases it can, for example, be an insoluble mixture of vapor or gas bubbles and liquid droplets.

In absorption processes in which the dispersed phase is present in gas or vapor form, the gas or vapor bubbles rise vertically through the flow channels in the packing elements.

In the case of a liquid-liquid extraction, the liquid phase rises in droplet form if it is lighter than the continuous phase or descends if the droplets are heavier than the continuous phase.

When the known packing elements in which the flow channels of any two adjacent layers cross one another openly are used for extraction or absorption processes, the transverse distribution of the dispersed phase is found to be unsatisfactory. This is because the dispersed phase flows through the packing elements not in the required channel direction but, in accordance with the forces of buoyancy, mainly in a direct vertical line. Consequently, one result is that the dwell time of the droplets or bubbles in the packing element is too short because of superimposed circulatory flows with a consequent reduction in mass transfer effects. Thus, a relatively large number of packing elements and, therefore, a considerable column height are required in order to achieve the required purity. In some cases, this may be economically unacceptable.

As is known, it has been impossible to achieve a completely uniform pre-distribution of the dispersed phase in large diameter columns. Further, local accummulations of the dispersed phase may lead to the formation of large volume circulating flows which may greatly reduce the effectiveness of the column by back-mixing. In the event that intermediate plates would be used between all the corrugated plates of the packing elements such might fail to provide the required separation because of unsatisfactory concentration compensation of any one of the dispersed phases over the column cross section.

Preferably, the droplets or bubbles are divided at the crossing places of the layers of the packing element which are open to one another. On the other hand, should the rising dispersed phase flow too long in an inclined channel, the rising phase may accummulate in the top part of the channel and coalesce. Consequently, the mass transfer surface of a column having only packing elements with intermediate plates between corrugated plates would be reduced.

Accordingly, it is an object of the invention to provide a mass transfer column which can be effectively used for extraction or absorption processes wherein at least one dispersed phase flows in countercurrent to a continuous phase.

It is another object of the invention to be able to distribute a dispersed phase transversely over a mass transfer column cross section in a satisfactory manner.

It is another object of the invention to avoid back-mixing in a mass transfer column in which extraction or absorption is taking place.

It is another object of the invention to collect and redistribute bubbles and/or droplets of a dispersed phase flowing through a mass transfer column for extraction or absorption purposes.

It is another object of the invention to reduce the cost for a first distribution of a dispersed phase with a distributor in a mass transfer column.

It is another object of the invention to provide an efficient transverse distribution of a continuous phase and a dispersed phase in a packing element for a mass transfer column.

Briefly, the invention provides a mass transfer column which is comprised of a plurality of vertically stacked packing elements which are disposed along a vertical axis. In accordance with the invention, the packing elements are constructed in different manners.

At least some of the packing elements include a plurality of vertically disposed corrugated layers and vertically disposed plane intermediate layers. In addition, each of the intermediate layers has a superficial area i.e. size which is, at most, equal to the superficial area size of the corrugated layers.

The remainder of the packing elements in the column each include a plurality of contacting layers with at least some of the contacting layers having corrugations defining flow channels. In addition, the corrugations are inclined to the vertical axis of the column and are disposed in criss-crossing relation to the adjacent contacting layer.

In the case of small mass transfer columns, the packing elements which use plane intermediate layers have these layers disposed between any two adjacent corrugated layers. In addition, the packing elements may be disposed one above another with the layer direction turned through a right angle.

In the case of large diameter columns, the packing elements which employ the plane intermediate layers are constructed so that each plane intermediate layer is provided between two groups of parallel-corrugated layers with the corrugations of one group crossing the corrugations of the other group.

By combining packing elements having different operating effects, a number of advantages are obtained in extraction and/or absorption processes. For example, the packing elements having plane intermediate layers permit a transverse conveyance of the dispersed phase while surpressing axial mixing. The packing elements which are devoid of plane intermediate layers aid in maintaining dispersion and mass transfer.

Of note, the packing elements need not be arranged in any particular sequence. Instead, the various packing elements can be arranged to suit the process required to be carried out in a column.

For example, it may be convenient or even necessary for packing elements to be disposed not only at the entry of a dispersed phase into a mass transfer section of a column but also between the entry and exit of the two phases in the mass transfer section. This is advantageous in cases in which further cross-distribution of the dispersed phase seems desirable.

Consequently, conventional intermediate collectors and distributors and screening plates which limit the load cease to be necessary and the height of the mass transfer section may in some circumstances be reduced considerably.

Since the manufacturing reasons make it impossible for the height of a packing element to be unrestricted while the ratio of the height to the diameter of a packing element is a determining factor in cross-distribution of the dispersed phase, a number of packing elements with plane intermediate layers which are arranged in the same direction can be placed in the column one above another. This feature is particularly advantageous for large diameter columns.

Another advantageous feature is that a mass transfer section of a column may be provided with at least one packing element wherein the plane intermediate layer between two adjacent corrugated layers masks only some of the corrugated layers from one another.

In another advantageous embodiment of packing elements of this kind, at least two rows of intermediate layers are disposed one above another along the column longitudinal axis while being staggered relative to one another with the lateral boundaries extending as far as the column inner wall. The intermediate layers can be of the same length; for instance, the height of the intermediate layers can be approximately half the height of the layers which have flow channels.

In another embodiment of such packing elements, the height of the intermediate layers can correspond at least substantially to the fluting height of the corrugated layers and the intermediate layers can extend widthwise at least substantially to the lateral boundary of the adjacent corrugated layers. In addition, each intermediate layer can be formed with at least one recess which extends at least substantially over the whole width of the plane intermediate layer and whose height corresponds at least to the fluting width of the corrugated layers. Each recess may also be in the form of a number of partial recesses which can be, for example, circular or square or trapezoidal or triangular.

The embodiments hereinbefore described have provision within each individual packing element for both cross-conveyance of the dispersed phase and also for suppression of axial mixing and also for maintaining dispersion and mass transfer.

In columns having a mass transfer section using the different types of packing elements, the dispersed phase can be supplied to the lower or upper column cross-section through the agency of any required distributing facility.

In narrow cross-section columns, the dispersed phase can, for instance, be supplied as a stream, whereas, for large-diameter columns, a perforated tube distributor or a filter plate can be conveniently used.

These and other objects and advantages of the invention will become more apparent from the following detailed description taken in conjunction with the accompanying drawings wherein:

FIG. 6' illustrates a view taken on line A—A of FIG. 6;

FIG. 7' illustrates a broken partial side view of the packing element of FIG. 7;

FIG. 7" illustrates a further partial side view of the packing of FIG. 7;

Figure 1:
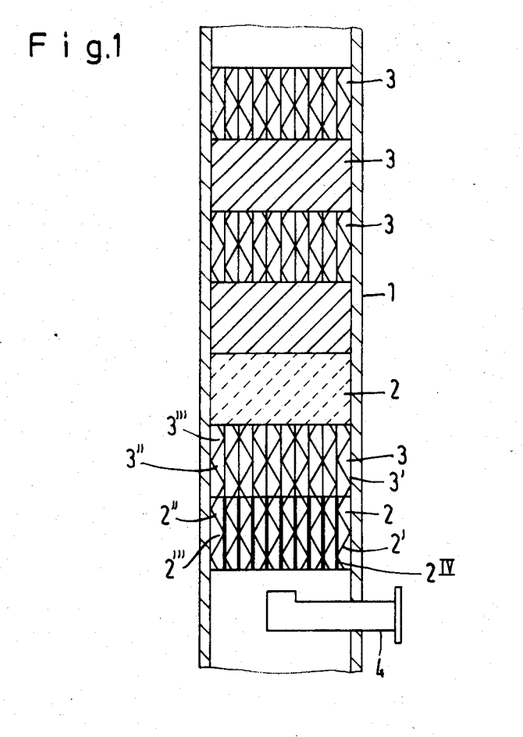
FIG. 1 illustrates a diagramatic longitudinal cross-sectional view of a mass transfer column constructed in accordance with the invention.

Referring to FIG. 1, the mass transfer column has a peripheral wall 1 within which a plurality, e.g. seven, of packing elements 2,3 are vertically stacked one above the other along a vertical axis. As indicated, the packing elements 2,3 are of two types.

Figure 1A:
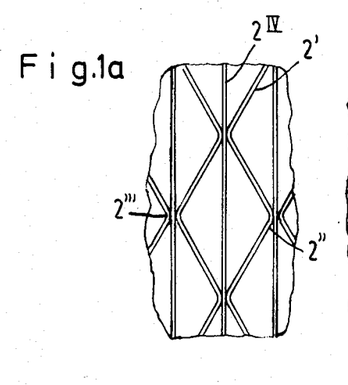
FIG. 1a illustrates an enlarged partial cross-sectional view through one type of packing element used in the column of FIG. 1.
Figure 3:
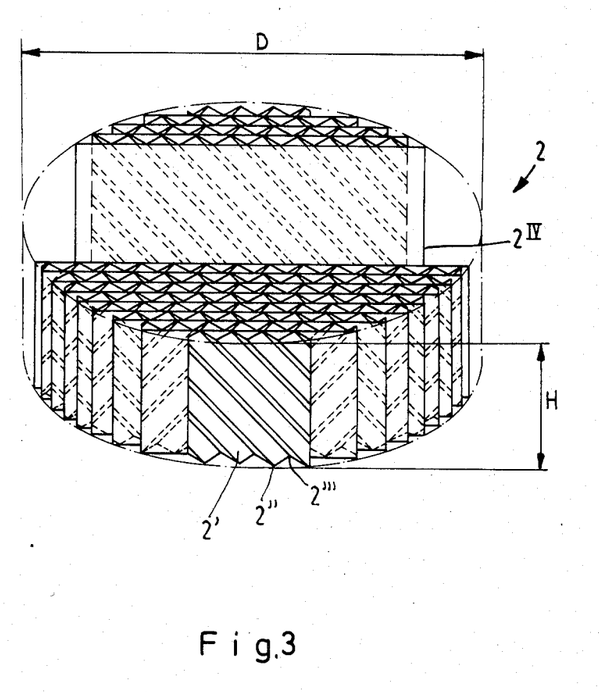
FIG. 3 illustrates a perspective view of a packing element employing an intermediate plane layer in accordance with the invention.

As can be gathered from FIG. 1a and FIG. 3, the elements 2 comprise fluted or corrugated layers 2' which having flutings or corrugations 2" forming flow channels 2'" and a plane intermeidate layers $2^{IV}$ which are introduced between any two fluted layers 2', whose flutings 2" cross one another.

As indicated in FIG. 3, each packing element 2 has a height H and a diameter D.

Figure 1B:
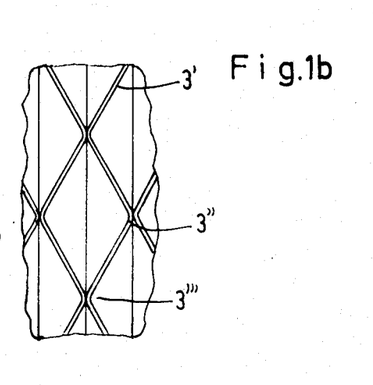
FIG. 1b illustrates a cross-sectional view of a second type of packing element used in the column of FIG. 1.
Figure 4:
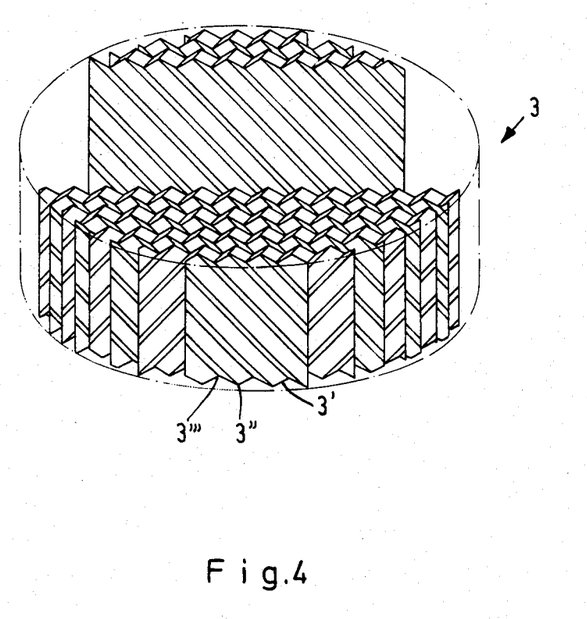
FIG. 4 illustrates a perspective view of a packing element of generally known construction.

As can also be gathered from FIGS. 1b and 4, the remaining packing elements 3 have corrugated elements 3' which define flow channels 3'" with the flutings 3" or corrugations of engaging layers crossing one another and therefore being open to one another at the crossings.

It will be assumed that the column is to receive a dispersed phase which is lighter than a received continuous phase. Hence, the dispersed phase is supplied through a feed tube 4 in the form of a stream to the underside of the bottom packing element 2.

The dispersed phase is then distributed in the bottom packing element 2 over the column cross-section along parallel parts of the cylinder cross-section. The distributed dispersed phase then flows through the element 3 above in which there is an intensive mass transfer with the continuous liquid phase descending through the flow channels 3'".

In the embodiment shown in FIG. 1, consecutive elements 2 and 3 are not turned at right-angles to one another and so their layers are disposed in parallel planes.

Disposed above the lowest-but-one element 3 is another element 2 whose corrugated and plane layers have been rotated through 90° relative to the column axis so that the dispersed phase is cross-distributed at right angles, relative to the transverse distribution in the lowest-but-one element 3, in parallel parts of the cylinder cross-section.

Assuming that the dispersed phase has been distributed uniformly over the whole column cross-section to the required extent, further elements 3 are disposed above the second element 2, adjacent elements 3 being at a 90° offset from one another. Should it be required to subject the dispersed phase to a single or repeated cross-distribution before issuing from the column 1, further elements 2 can be disposed in the mass transfer section.

The embodiment which is shown in FIG. 1 and in which elements 2 are provided for cross-distribution in the mass transfer section of the column 1, is of use particularly for relatively narrow columns.

Figure 2:
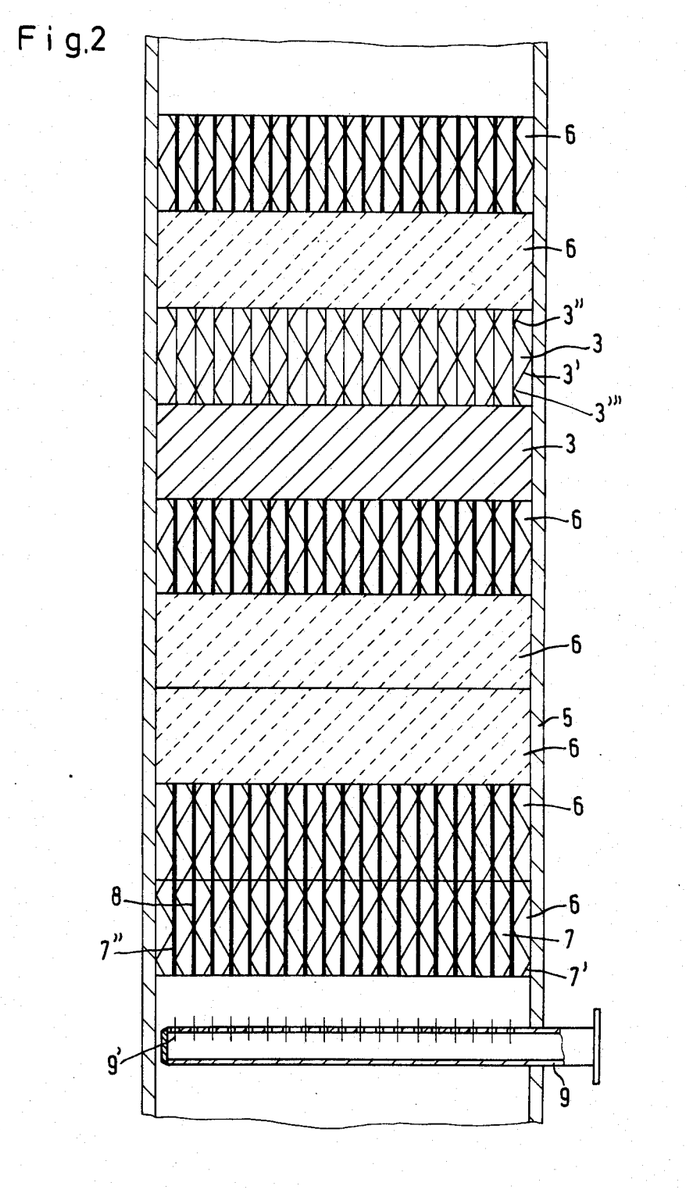
FIG. 2 illustrates an enlarged cross-section view of a bottom part of a column having a modified arrangement of packing elements in accordance with the invention.
Figure 5:
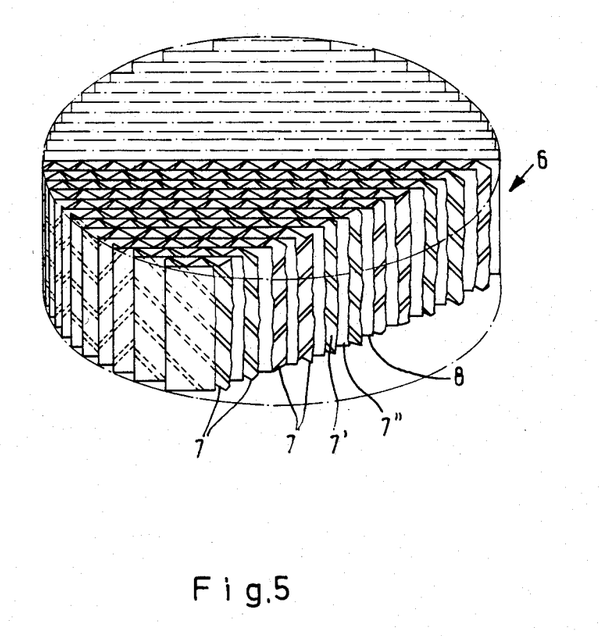
FIG. 5 illustrates a perspective view of a modified packing element employing an intermediate plane layer in accordance with the invention.

Referring to FIG. 2, a column 5 may have a bottom mass transfer part provided with seven packing elements 6 having intermediate layers and two packing elements 3 without such layers. The four bottom elements 6 each take the form of two groups 7 of layers 7' having parallel fluting directions and plane intermediate layers 7", the flutings of one group crossing the flutings of the adjacent group (see also FIG. 5).

Intermediate layers 7" and 8 are disposed between the various layers and layer groups. However, the intermediate layers 8 can be omitted. Also, any group can comprise more than two parallel-fluted layers and plane intermediate layers. This depends upon the required zone where cross-distribution of the dispersed phase occurs in one direction and depends upon column diameter and upon the construction of a distributor 9 which, in this embodiment, is a distributing tube formed with orifices 9'. For cost reasons, the orifices cannot be very close together. Also, the only way of ensuring a uniform supply to all the orifices is to ensure a corresponding pressure drop above the orifices, the resulting increased exit velocity of the dispersed phase producing unwanted fine droplets.

The two bottommost packing elements 6 are so disposed in the bottom mass transfer part of the column 5 of this embodiment that the fluted and plane layers are disposed in the same plane, so that the flow channels of the two furniture elements merge into one another substantially continuously.

Consequently, the dispersed phase is cross-distributed satisfactorily over the column cross-section and the various elements 6 can be of a height which does not cause production problems.

If the fluting direction of the layers, instead of being equal in pairs, was to be offset as between individual layers, the manufacturing tolerance of the elements might make it likely that, in the event of a shift of layers, the original cross-conveyance direction from the bottom element would not be retained but, in accordance with the fluting direction, would proceed in the opposite direction.

The two packing elements disposed above the bottom two elements 6 are of similar construction but turned through right-angles relative to the bottom pair.

FIG. 2 shows a fifth top packing element 6. As in FIG. 1, in the region above the mass transfer part of the column 5, two packing elements 3 without intermediate layers, as shown in FIGS. 1 and 3, are disposed at an offset of 90° from one another.

In the region above the mass transfer section, two packing elements 6 are disposed at an offset of 90° to one another and produce a further cross-mixing of the dispersed phase.

FIGS. 6–12 show embodiments having packing elements in which the plane intermediate layers mask only some of adjacent fluted layers from one another.

Figures 6, 7:
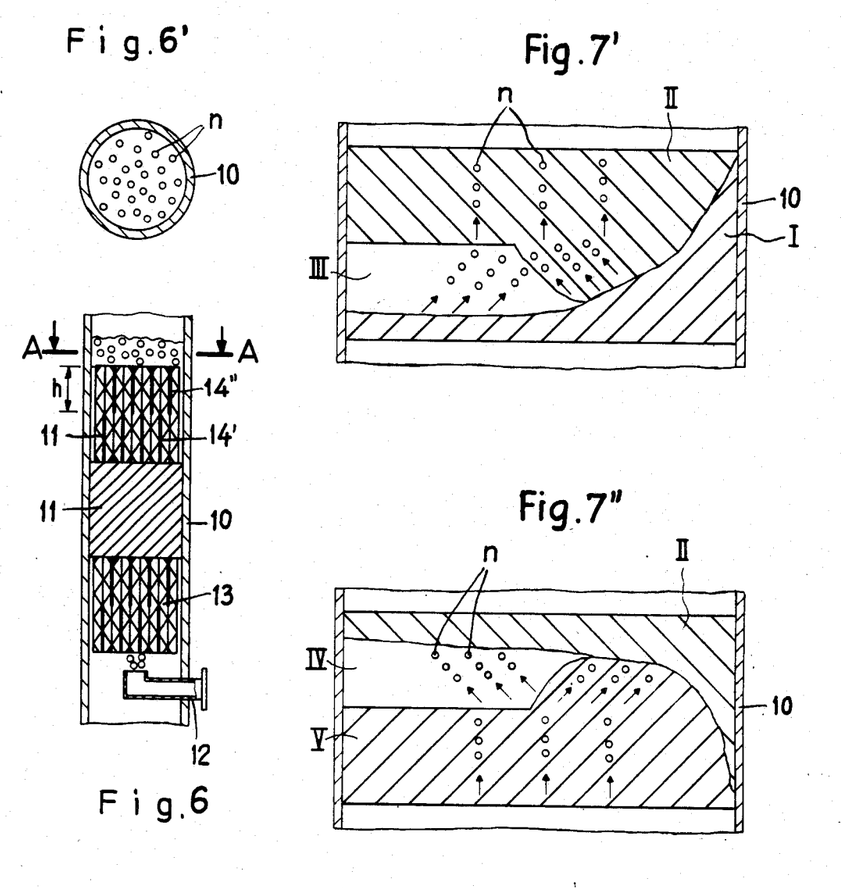
FIG. 6 illustrates a partial longitudinal sectional view of a column having three packing elements which incorporate plane intermediate layers.
FIG. 7 illustrates an enlarged view of a packing element of FIG. 6.
Figure 7:
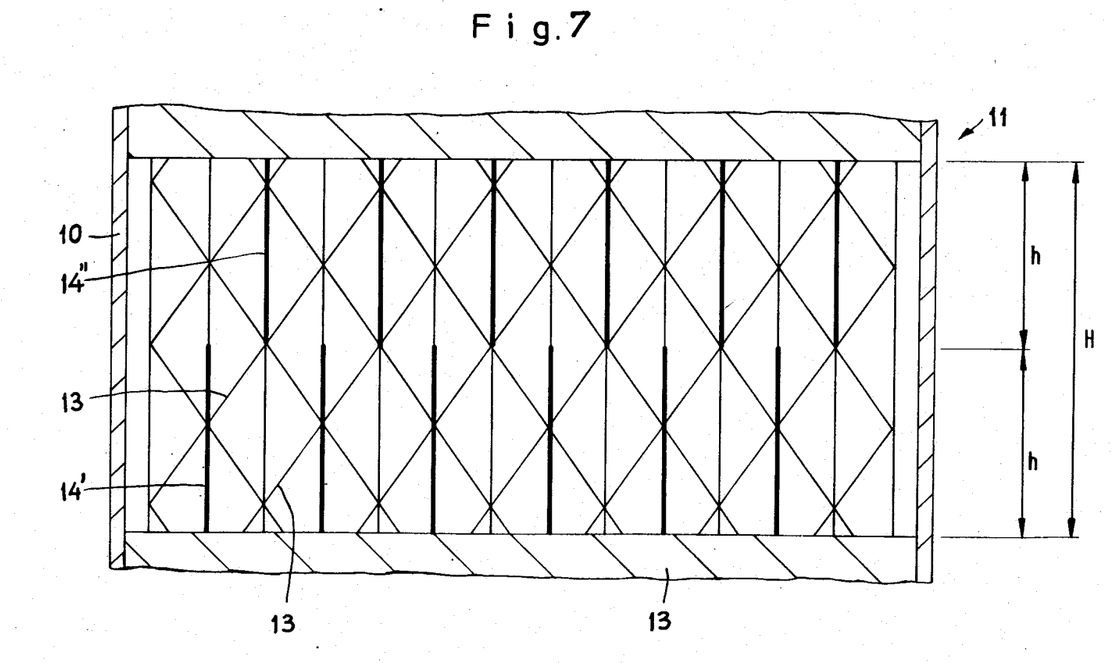

Referring to FIG. 6, a stream of dispersed phase is supplied through a supply tube 12 to the bottom of the bottom packing element in a column 10 in which three packing elements 11 are disposed one above another, the central element being offset at right-angles around the column longitudinal axis relative to the adjacent elements. The supply of the dispersed phase may also be another type; for instance, the dispersed phase could be introduced through a distributing tube formed with orifices or through a filter tray.

Two rows of plane intermediate layers 14', 14" are disposed along the longitudinal axis of the column 10 between every two adjacent corrugated layers 13 in each packing element, the intermediate layers of the rows, the same being disposed one above another, being staggered relative to one another and having the same height h which corresponds to half the height H of the corrugated layers 13—i.e., the layers 13 having flow channels (see also FIG. 7).

Consequently, bubbles or droplets n of the dispersed phase are uniformly distributed over the column cross-section, as shown in FIG. 6' and as will be described in greater detail hereinafter with reference to FIGS. 7' and 7".

FIGS. 7' and 7" are partial views of in all five consecutive layers, i.e. three corrugated layers I, II and V which are identical to the corrugated layers 13 of FIGS. 6 and 7 and two plane intermediate layers III and IV. One plane intermediate layer III is disposed between the fluted layers I and II and the other plane intermediate layer IV is disposed between the fluted layers II and V.

In those parts of the packing element 11 which engage one another directly without the interposition of intermediate layers, the bubbles or droplets n of the dispersed phase rise vertically upwards unhampered by the structure of the flow channels. But, in the parts in which a plane intermediate layer is present between two oppositely corrugated layers, the bubbles or droplets n are deflected outwardly in opposite directions by the flow channels of the corrugated layers.

Figure 8:
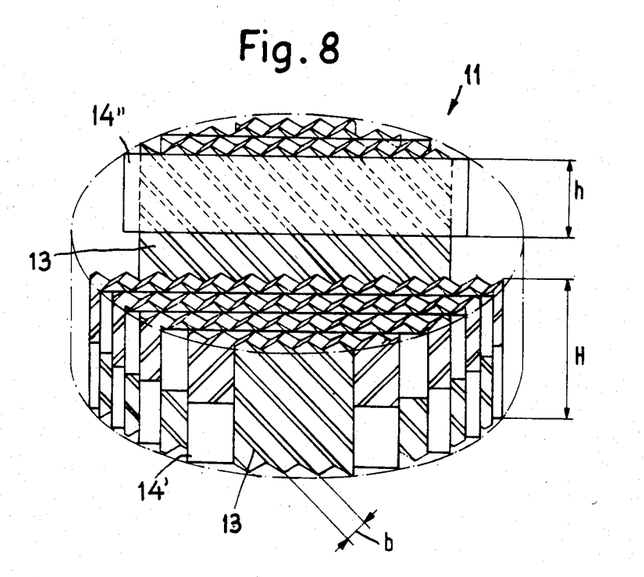
FIG. 8 illustrates a perspective view of a packing element of the type illustrated in FIG. 7.
Figure 9:
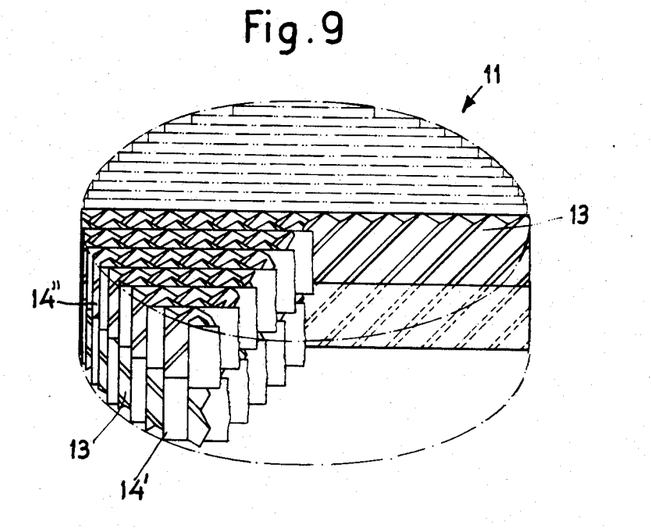
FIG. 9 illustrates a perspective view of another part of the packing element of FIG. 7.

Referring to FIGS. 8 and 9 which are perspective views of parts of a packing element 11, each plane flow channel is of a width b. For the rest, the same reference figures as used in FIGS. 6 and 7 are used for all the elements.

Figure 10:
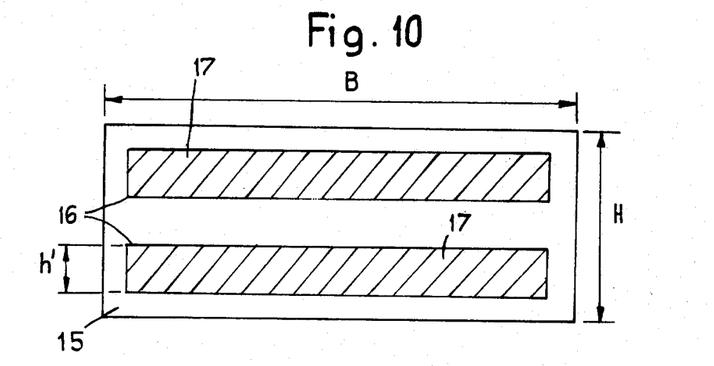
FIG. 10 illustrates a modified plane intermediate layer employing a pair of longitudinal recesses in accordance with the invention.
Figure 11:
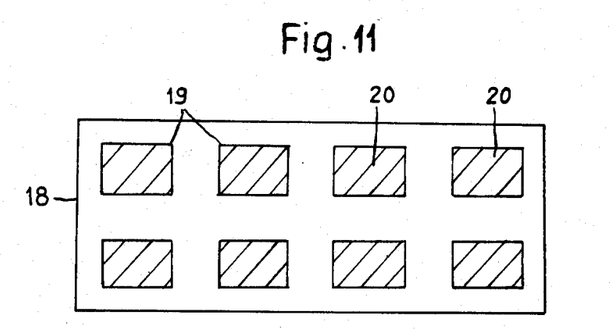
FIG. 11 illustrates a modified intermediate plane layer employing a plurality of partial recesses in accordance with the invention.
Figure 12:
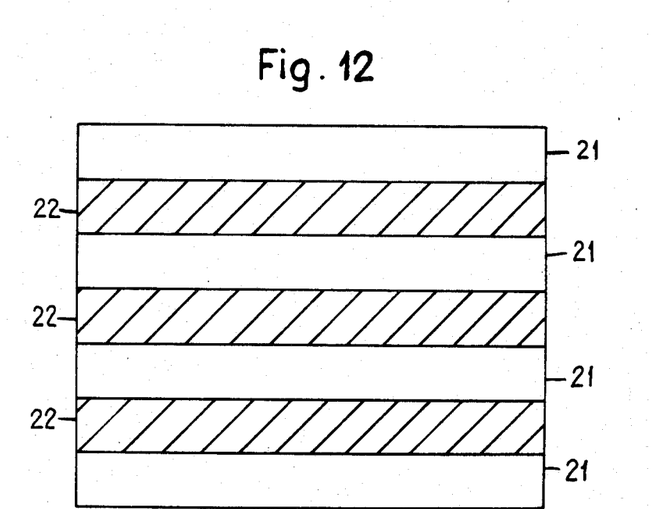
FIG. 12 illustrates a modified plane intermediate layer employing modified recesses in accordance with the invention.

Instead of alternating staggered plane intermediate layers as shown in FIGS. 6, 7, 7', 7", 8 and 9, the intermediate layers can be positioned, for instance, in accordance with FIG. 10 or 11 or 12.

In this case, the height H and the width B of the intermediate layers shown in FIGS. 10 and 11 are identical to the height and width of the corrugated layers of a packing element. A plane intermediate layer 15 is disposed between every two corrugated layers.

Referring to FIG. 10, the intermediate layer 15 is formed with two rectangular apertures 16 disposed one above another in spaced-apart relationship and extending over most of the width B, the height h' of each aperture corresponding at least to the corrugation width b (see FIG. 8) of a corrugated layer. A corrugated layer 17 can be seen behind the intermediate layer 15 in FIG. 10.

The intermediate layer 18 shown in FIG. 11 has the same dimensions as the corrugated laters. However, instead of apertures 16 which extend over substantially the entire width, the intermediate layer 18 is formed with two rows, one above another, of discrete square apertures 19 whose height also corresponds at least to the corrugation width b of the layers engaging the intermediate layers. A corrugated layer 20 can be seen behind the intermediate layer 18.

The apertures, instead of being square, can be, for example, circular or rectangular or triangular in cross-section.

Referring to FIG. 12, the intermediate layer may also take the form of discrete rectangular strips 21 disposed one above another in spaced-apart relationship. The dimensioning of the spacings is governed by the same considerations as for the layers of FIGS. 10 and 11. A corrugated layer 22 is visible behind the strips 21.

The intermediate layers can be made, for instance, of metal or plastics, conveniently, from the same material as the corrugated layers.

The corrugated layers and intermediate layers forming the packing elements can be joined together, for instance, by spot welding or, in the case of the embodiment shown in FIGS. 10 to 12, can be introduced consecutively and individually into a column and therefore be self-centering. If required, the layers can be rigidly connected to the column inside wall, for instance, by welding.

The invention thus provides a mass transfer column within which a continuous phase and at least one dispersed phase may be uniformly distributed across the cross-section of a column in an efficient manner for an efficient mass transfer. The column is particularly suitable for extraction or absorption processes.

The invention further provides a mass transfer column wherein droplets or bubbles of a dispersed phase may have a sufficient dwell time without having superimposed circulatory flows imparted thereto.

Further, the invention provides a mass transfer column of relatively low height and with a minimum number of packing elements to achieve relatively pure extraction or absorption results.

What is claimed is:

1. A mass transfer column comprising
   a plurality of vertically stacked packing elements disposed along a vertical axis;
   some of said packing elements including a plurality of vertically disposed corrugated layers and vertically disposed plane intermediate layers, said intermediate layers each having a size at most equal to the size of said corrugated layers; and
   each of the remainder of said packing elements including a plurality of contacting layers, at least most of said contacting layers having corrugations defining flow channels and being inclined to said vertical axis and in criss-crossing relation to an adjacent layer.

2. A mass transfer column as set forth in claim 1 wherein each of said remainder of said packing elements is formed exclusively of corrugated layers and each of said some of said packing elements is formed of corrugated layers and plane intermediate layers of the same sizes as said corrugated layers.

3. A mass transfer column as set forth in claim 2 wherein each plane intermediate layer is disposed between two adjacent corrugated layers.

4. A mass transfer column as set forth in claim 2 wherein each of said some of said packing elements includes two groups of parallel-corrugated layers with plane intermediate layers, and said corrugations of one group cross said corrugations of the other group.

5. A mass transfer column as set forth in claim 2 wherein said remainder of said packing elements are of a different number from said some of said packing elements.

6. A mass transfer column as set forth in claim 2 wherein the height of said intermediate layers corresponds at least substantially to the height of said corrugations of said corrugated layers and said intermediate layers extend widthwise at least substantially to the lateral boundary of the adjacent corrugated layers, each intermediate layer being formed with at least one recess extending at least substantially over the whole width of said intermediate layer and of a height corresponding at least to said corrugation width of said corrugated layers.

7. A mass transfer column as set forth in claim 6 wherein each recess is in the form of a plurality of partial recesses.

8. A mass transfer column as set forth in claim 1 wherein each plane intermediate layer is disposed between two adjacent corrugated layers and said remainder of said packing elements are disposed in alternating relationship with said some of said packing elements.

9. A mass transfer column as set forth in claim 1 wherein each plane intermediate layer is disposed between two adjacent corrugated layers and said remainder of said packing elements are disposed in alternating group relationship with said some of said packing elements.

10. A mass transfer column as set forth in claim 1 wherein each of said some of said packing elements includes two groups of parallel corrugated layers with plane intermediate layers, and said corrugations of one group cross said corrugations of the other groups, and said remainder of said packing elements are disposed in alternating relationship with said some of said packing elements.

11. A mass transfer column as set forth in claim 1 wherein each of said some of said packing elements includes two groups of parallel corrugated layers with plane intermediate layers, and said corrugations of one group cross said corrugations of the other group, and said remainder of said packing elements are disposed in alternating group relationship with said some of said packing elements.

12. A mass transfer column as set forth in claim 1 wherein at least one of said packing elements has a plane intermediate layer between two adjacent corrugated layers, said intermediate layer masking some of said corrugated layers from one another.

13. A mass transfer column as set forth in claim 12 wherein said one packing element has at least two rows of intermediate layers disposed one above another along said vertical axis, said intermediate layers of said rows being staggered relative to one another.

14. A mass transfer column as set forth in claim 13 wherein said intermediate layers are of the same height as one another.

15. A mass transfer column as set forth in claim 14 wherein the height of said intermediate layers is about half the corrugation height of said corrugated layers.

* * * * *

UNITED STATES PATENT AND TRADEMARK OFFICE
CERTIFICATE OF CORRECTION

PATENT NO. : 4,623,454
DATED : November 18, 1986
INVENTOR(S) : Willy Tauscher, Felix Streiff and Peter Mathys It is certified that error appears in the above-identified patent and that said Letters Patent is hereby corrected as shown below:

```
Column 2, line 5 "accummulations" should be -accumulations-
Column 2, line 19 "accummulate" should be -accumulate-
Column 3, line 14 "surpressing" should be -suppressing-
Column 4, line 19 "diagramatic" should be -diagrammatic-
Column 5, line 1 "having" should be -have-
Column 6, line 61 "of in all five" should be -of, in all,
    five-
Column 7, line 33 "laters" should be -layers-
```

Signed and Sealed this

Seventeenth Day of March, 1987

Attest:

DONALD J. QUIGG

Attesting Officer    Commissioner of Patents and Trademarks